Sept. 4, 1928.  
V. C. DOERSCHUK  
1,683,587
CARBON ELECTRODE AND METHOD OF MOLDING THE SAME  
Filed July 19, 1927
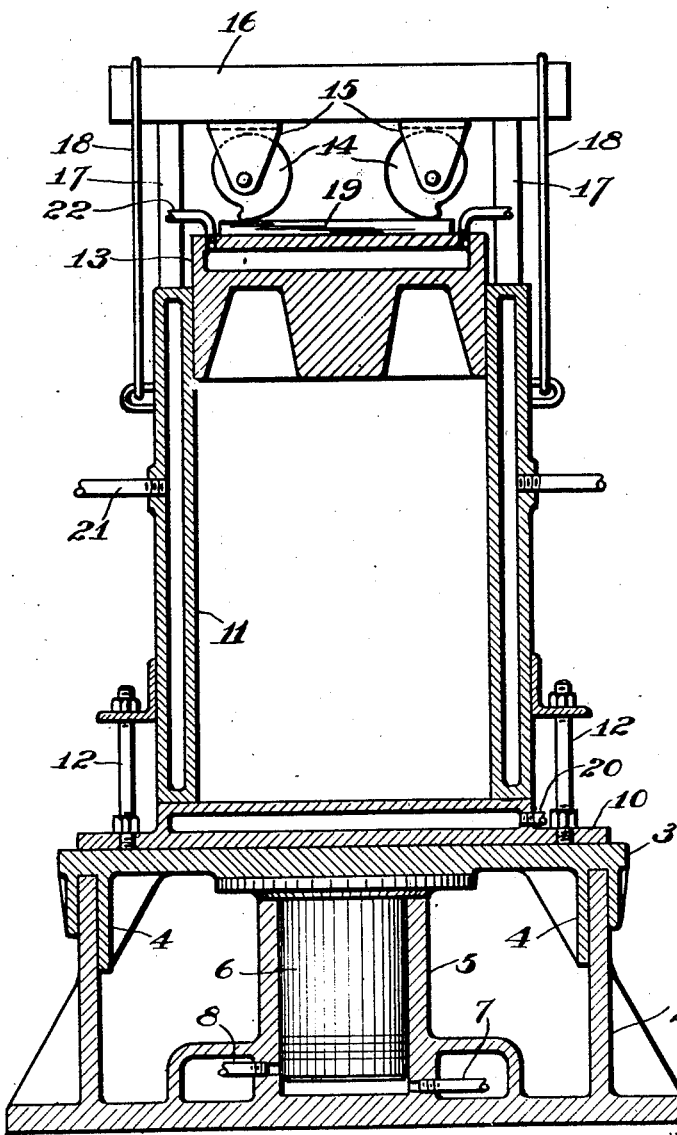
WITNESS  
A. B. Wallace.
INVENTOR  
Victor C. Doerschuk,  
by Brown & Critchlow,  
his attorneys.

Patented Sept. 4, 1928.

1,683,587

UNITED STATES PATENT OFFICE.

VICTOR C. DOERSCHUK, OF MASSENA, NEW YORK, ASSIGNOR TO ALUMINUM COMPANY OF AMERICA, OF PITTSBURGH, PENNSYLVANIA, A CORPORATION OF PENNSYLVANIA.

CARBON ELECTRODE AND METHOD OF MOLDING THE SAME.

Application filed July 19, 1927. Serial No. 206,922. REISSUED

The invention relates to the molding of mixtures of granular materials, such as coke and silicon carbide, and plastic binders of relative viscous bitumens such as pitch and tar, the binder being added to and mixed with the granular materials to render them coherent when molded. While in its broader aspects the invention is unlimited to any specific article or class of articles, it is particularly applicable to the manufacture of carbon electrodes such as are used in electric furnaces for metallurgical and like operations.

In the manufacture of such electrodes, ground coke, or other suitable granular carbonaceous material, is mixed with tar or pitch, or with a mixture of tar and pitch, to form a mass which is then molded into desired form by tamping or pressing it in a mold, or by extruding it under high pressure through a die. Thereafter the molded article is fired or baked at a temperature of about 1000° C. to harden it and to remove the volatile constituents of the binder. By reason of its bituminous binder, the mixture just explained is stiff, unconsolidated, contains voids or air pockets, and tends to ball up when handled, and because of these physical characteristics it is difficult in the prevailing tamping and extrusion molding processes to secure the desired degree of density, or uniform density and freedom from interior defects, particularly in larger articles such as electrodes of twenty inches or more in diameter. Also, when electrodes are molded by the extrusion process, cores are formed because the mixture does not flow equally throughout the cross section of the die.

The object of this invention is to provide a method of molding mixtures of granular materials and viscous bitumens whereby articles having uniform increased density may be economically formed.

The invention is predicated upon my discovery that a granular material mixed with a bituminous plastic binder to form a normally non-coherent and unconsolidated mass, may be readily molded into a compact coherent mass of substantially uniform increased density throughout, and substantially free from internal defects, by confining the mixture in a mold and subjecting the mold and its contents to a repeated jarring action.

In forming carbon electrodes of the type to which reference has been made, the general practice is to prepare a mixture containing from about 70 to 88% of crushed or ground carbon, such as anthracite, petroleum coke, and electrode scrap or graphite which has been calcined to uniformly and thoroughly remove its volatile constituents, and from about 12 to 30% tar and pitch. The relative proportions of the tar and pitch vary for different service requirments of the electrodes, and with respect to the different conditions of the mix itself. In fact, due to variations in these and other factors, the mixes may contain from 50 to 95% of ground carbonaceous material and from 50 to 5% of binder. These materials are thoroughly mixed in a suitable mixer, and the mixture, because of its bituminous binder, has the physical characteristics previously explained.

According to the present invention, an unconsolidated mix, which may be the same as heretofore used, is placed in a suitable vertical mold adapted to be supported by, or forming a part of, a jolting machine of any suitable or desired construction. Prior to being placed in a mold the mix is preferably heated to a temperature of about 100° C., depending of course on the character of the binder, and to prevent the chilling of the mix by its contact with the walls of the mold, the mold is preferably heated prior to the introduction of the mix. This mix may be shoveled into the mold, or conveyed to it by a continuous belt or other type of conveyor. While it is being filled with the mix the mold is preferably jolted, and, when supplied with the required amount of the mix, a heated weight is placed upon its upper surface to confine it and to exert pressure upon it while the jolting operation is continued in a vertical direction for a sufficient period of time to thoroughly compact and densify the mix. In place of a weight, other instrumentalities may be used to confine the upper portion of the mix in a mold during the jarring operation. At the end of the jarring operation it has been found to be advantageous to cool the mold and the surface of the molded article before removing the molded article from it.

Various forms of jolting machines of the type contemplated are well known, and commonly used in the forming of sand molds in foundries for casting metals, and for other purposes. By way of illustration and not of limitation, there is somewhat diagrammatically shown in the accompanying drawing a vertical central sectional view of a form of pneumatic jolting machine which may be used, and supported on such machine there is shown a vertical central sectional view of a mold for forming a carbon electrode.

The jarring machine comprises a base 1 having sides 2 and a table 3 provided with downwardly extending guides 4 which telescopically receive the upper end of sides 2. The base is provided centrally with a cylinder 5 which receives a piston 6 attached to table 3. For raising the table, pressure fluid may be supplied to cylinder 5 through a pipe 7, and to permit the table to fall the pressure fluid may be exhausted from the cylinder through a pipe 8.

The mold resting upon table 3 comprises a base 10 and a vertical side wall 11 which may be attached to the base by bolts 12, as shown. A weight 13 is arranged in the upper portion of the mold to confine the upper end of an electrode mixture during the jarring operation. To hold the weight against displacement, a pair of gravity cams 14 are pivotally mounted eccentrically in brackets 15 attached to the lower end of a bar 16 extending transversely of the mold, the bar being supported by posts 17, and tied to the mold by links 18. Between cams 14 and the top of weight 13 there is a filler 19 of variable thickness. As material in the mold becomes compacted in a jarring operation, gravity cams 14 gradually wedge themselves between bars 16 and filler 19 to hold weight 13 firmly against the top of the material.

As shown, mold base 10, vertical wall 11, and weight 13 may be of double-wall construction for heating these parts before a molding operation, steam or other heated fluid being supplied to those parts through pipes 20, 21 and 22. At the end of the molding operation, a cooling fluid may be introduced into these mold parts to facilitate the removal of a molded electrode.

By the way of example, I have found that in the manufacture of carbon electrodes a mixture formed of about 35% coarse petroleum coke, 43% fine petroleum coke, 10% ground butts of electrodes, 9% pitch and 3% tar, when placed in a mold for forming a 12" by 16" electrode, may be thoroughly compacted to form a coherent and uniformly dense molded mass by jarring the mold for five minutes on a heavy duty jolting machine, using a weight of about two thousand pounds upon the top of the mix after the mold has been supplied with the required amount of it.

As an example of the applicability of the invention to the economical production of much larger electrodes, a mixture composed of about 40% baked electrode scrap ground to pass a one inch mesh screen, about 30% calcined anthracite coal flour ground so that 60% of it passed through a 200 mesh screen and approximately 30% pitch as a binder was gradually fed into an octagonal mold supported on a jolting machine which was operated at the rate of sixty drops per minute while the mix was being added. The greatest sectional dimensions of this mold were 26 and 44 inches. The mix, at a temperature of about 150° C., was continuously added at the rate of several hundred pounds per minute, the mold being previously heated to about 165° C. After the mold was supplied with the required amount of mix, a weight of about six thousand pounds was placed on top of the mix and the machine run for three minutes. This electrode was 139 inches long, weighed 8240 pounds, and the total time required to make it was 29 minutes.

Carbon linings of furnaces used in metallurgical operations, such as those used in the production of aluminum by the well known Hall process, may be molded in place in a similar manner. In making such linings the mixture may be about 86% of metallurgical bituminous coal coke and about 14% tar and pitch, although other proportions and mixes may be used. The mixture is placed in the furnace shell itself, a form and weight is placed on top of the mixture, and the entire furnace shell, lining-forming mixture, form, and weight then jolted until the mixture is properly compacted.

In the manufacture of articles of the type herein contemplated the green molded mixtures are baked to harden them and to remove the volatile constituents of the binder, its non-volatile constituents remaining in the article as coke or graphite, depending on the temperature of baking. In electrodes and furnace linings it is particularly desirable that they be as free as possible of voids. By the practice of this invention this desideratum is readily attained, particularly in the case of very large articles, which, prior to this invention, have been largely made by hand.

An important advantage incident to the manufacture of electrodes according to this invention has to do with the prevailing position in which irregularly shaped particles of a mix lie by reason of the jolting operation. In the extrusion process of molding electrodes the tendency is for the larger dimensions of ununiform particles of carbon to lie in the direction of the extrusion, and in the tamping process there is little if any tendency towards any definite orientation of the particles. In the practice of this invention the jolting causes the majority of the particles to so orient themselves that they lie with their largest cross sectional area in a direction at right angles to the jolting, or in other words at right angles to the longitudinal axis of a finished electrode. The particles therefore lie in the direction of radial heat conductivity from the electrode and of resistance to heat conductivity axially of the electrode. The resistance to heat conductivity along the axis of the electrode lessens the transfer of heat from the lower to the upper portion of an electrode when the lower portion is subjected to a high temperature, as by being immersed in a molten bath, and, to the extent that such conduction of heat is lessened, the rate of oxidation of the upper portion of the electrode is lowered. Furthermore, such heat as is generated in and conducted to the upper portion of the electrode is dissipated with greater rapidity by reason of the increased radial conductivity of heat.

A further advantage of this invention, as compared to the prevailing extrusion process, is that electrodes may be manufactured much more economically because of the relatively inexpensive machinery that is required, and of the light inexpensive molds which may be used instead of expensive dies. Cheap weights, or equivalent pressure-applying instrumentalities, replace the very heavy and expensive presses, hydraulic accumulators, pumps and other apparatus used in the extrusion process. These advantages, taken in connection with the increased uniformity of density effected by the practice of the invention, result in improved products manufactured by manifest economies.

Furthermore, as previously indicated, the invention is applicable to the molding of granular materials other than carbon when mixed with a bituminous binder.

According to the provisions of the Patent Statutes, I have explained the principle and mode of operation of my invention and have given specific examples of how it may be practiced. However, I desire to have it understood that, within the scope of the appended claims, the invention is not limited to the specific examples given, nor to the size of articles or the forms in which they are molded.

I claim as my invention:

1. The method of molding into a coherent mass a normally unconsolidated mixture of granular material and a viscous bituminous binder, comprising placing the mixture in a mold, and jarring the mold.

2. The method of method of molding into a coherent mass a normally unconsolidated mixture of granular carbon and a viscous bituminous binder, comprising heating the mixture, placing the heated mixture in a mold, and jarring the mold.

3. The method of molding into a coherent mass a normally unconsolidated mixture of granular carbon and a viscous bituminous binder, comprising heating the mixture, placing the heated mixture in a heated mold, and jarring the mold.

4. The method of molding into a coherent mass a normally unconsolidated mixture of granular carbon and a viscous bituminous binder, comprising heating the mixture to a temperature of not less than about 100° C., placing the heated mixture in a heated mold, jarring the mold to consolidate the mixture, and cooling the mold body before removing the molded mass.

5. The method of making a carbon electrode comprising forming an unconsolidated mixture of from about 70 to 88% ground carbon and from about 12 to 30% of viscous bituminous binder, placing the mixture in a mold, and jarring the mold to consolidate the mixture.

6. The method of making a carbon electrode comprising forming an unconsolidated mixture of from about 70 to 88% ground carbon and from about 12 to 30% of a binder composed of tar and pitch, placing the mixture in a mold, and jarring the mold to consolidate the mixture.

7. The method of making a carbon electrode, comprising forming a mixture of from about 70 to 88% ground calcined coke, and from about 12 to 30% of a binder composed of tar and pitch, heating the mixture, placing the heated mixture in a mold, and jarring the mold to consolidate the mixture.

8. The method of molding into a coherent mass a normally unconsolidated mixture of granular material and a viscous bituminous binder, comprising placing the mixture in a mold, confining and adding pressure to the upper surface of the mixture, and jarring the mold to consolidate the mixture.

9. The method of molding into a coherent mass a normally unconsolidated mixture of from about 70 to 88% ground carbon and from about 12 to 30% of a viscous bituminous binder, comprising heating the mixture, placing the heated mixture in a heated mold, confining and adding pressure to the upper surface of the mixture, and jarring the mold to consolidate the mixture.

10. A carbon electrode comprising a baked mixture of ground carbon and a bituminous binder, the electrode having greater lateral than longitudinal heat conductivity.

11. A carbon electrode comprising a baked mixture of ground carbon and a bituminous binder, the major portions of the particles of carbon having their largest cross sectional areas lying in planes transverse to the longitudinal axis of the electrode whereby the electrode has greater lateral than longitudinal heat conductivity.

12. A carbon electrode comprising a baked mixture of from about 70 to 88 per cent ground carbon, and from about 12 to 30 per cent of bituminous binder, the major portions of the particles of carbon having their largest cross sectional areas lying in planes transverse to the longitudinal axis of the electrode whereby the electrode has greater lateral than longitudinal heat conductivity.

In testimony whereof, I sign my name.

VICTOR C. DOERSCHUK.